United States Patent [19]

Furrow et al.

[11] Patent Number: 4,938,251
[45] Date of Patent: Jul. 3, 1990

[54] UNIVERSAL HOSE ADAPTER FOR GASOLINE PUMP

[75] Inventors: Roger W. Furrow, High Point; Kenneth L. Pope, Walkertown, both of N.C.

[73] Assignee: Gilbarco Inc., Greensboro, N.C.

[21] Appl. No.: 378,416

[22] Filed: Jul. 11, 1989

[51] Int. Cl.$^5$ ............................................. F16L 39/00
[52] U.S. Cl. ..................................... 137/269; 137/594; 137/602; 285/12; 285/137.1
[58] Field of Search .................. 137/602, 594, 269; 285/12, 137.1; 222/14

[56] References Cited

U.S. PATENT DOCUMENTS

| | | | |
|---|---|---|---|
| 1,381,865 | 6/1921 | Forsyth | 285/12 |
| 1,383,008 | 6/1921 | Myers . | |
| 1,752,631 | 4/1930 | Campbell . | |
| 1,820,020 | 8/1931 | Hewitt . | |
| 2,209,350 | 7/1940 | Robinson . | |
| 2,295,832 | 9/1942 | Chedister . | |
| 3,485,516 | 12/1969 | Keller et al. | 285/137.1 X |
| 3,720,378 | 3/1973 | Davis, Jr. | 239/397 |
| 3,811,712 | 5/1974 | Barrera | 285/132 |
| 4,278,275 | 7/1981 | Diederich | 285/12 |
| 4,595,217 | 6/1986 | Siegel | 285/12 |
| 4,611,831 | 9/1986 | Truchet | 285/137.1 X |

Primary Examiner—Stephen M. Hepperle
Attorney, Agent, or Firm—Kenneth Watov

[57] ABSTRACT

A universal hose adapter includes an upper member for permanent mounting on the piping housing of a blending type gasoline dispenser, and a plurality of lower members each mateable to the upper member, and each configured for permitting retrofitting of the dispenser to accept a particular hose configuration, in modifying the dispenser system. The upper member includes a vapor return outlet port for connection to the dispenser's vapor return line, if any; a vapor return outlet port; a plurality of gasoline input ports for connection to gasoline lines of the dispenser carrying different grades of gasoline, respectively; and a plurality of gasoline outlet ports associated with each gasoline inlet port, respectively. Each lower member includes appropriate ports along an upper face for coupling to associated one's of the ports along a lower face of the upper member, for connecting the latter via internal passsageways in the lower member to hose connecting ports along a lower face thereof permitting coupling to a predetermined hose configuration, for either a desired non-vapor recovery or vapor recovery blending type dispenser arrangement.

20 Claims, 10 Drawing Sheets

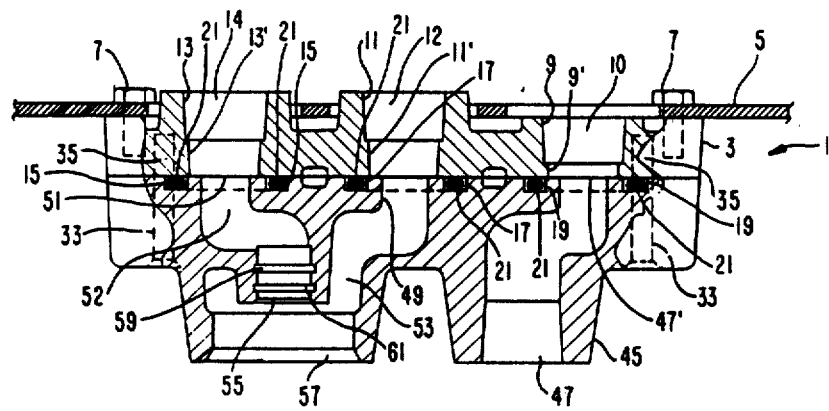
FIG. IA

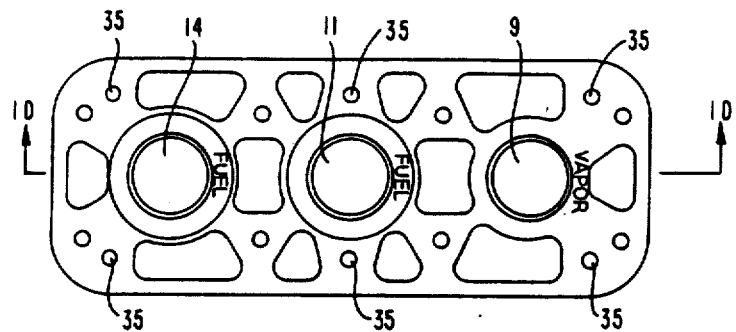
FIG. IB
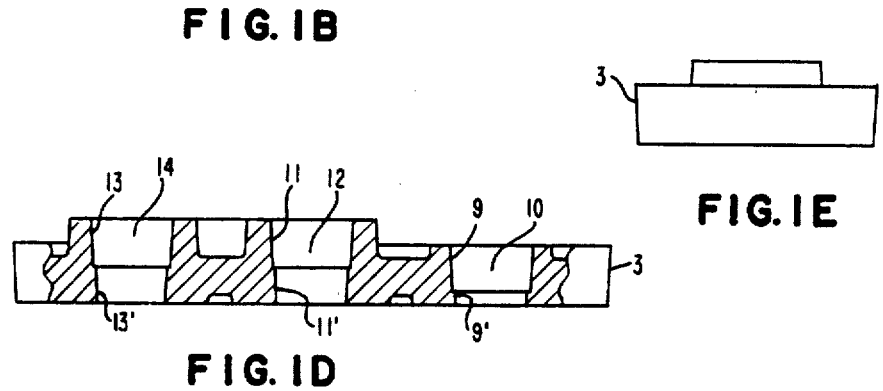
FIG. IE
FIG. ID
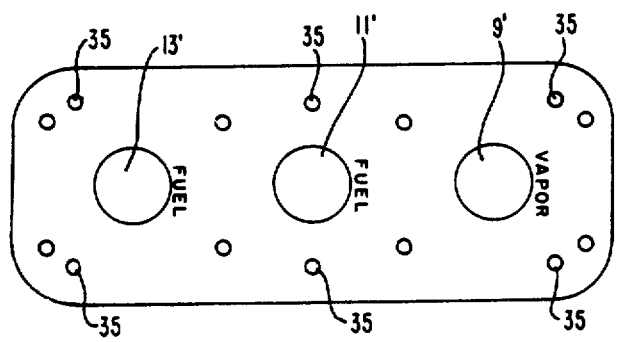
FIG. IC

UNIVERSAL HOSE ADAPTER FOR GASOLINE PUMP

FIELD OF THE INVENTION

The field of the invention relates generally to hose adapters, and more specifically to a hose adapter for permitting a gasoline pump or dispenser to be easily retrofitted to accommodate any one of a plurality of different hose configurations for either vapor recovery or non vapor recovery systems with or without blending.

BACKGROUND OF THE INVENTION

Many states now require that gasoline dispensers or pumps be equipped with vapor recovery mechanisms. Also, gasoline dispenser systems providing for the blending of two or more octane levels of gasoline to obtain a desired octane level of gasoline for dispensing are finding increasing use in the field. These different gasoline dispensing systems require a myriad number of hose and nozzle configurations. It is now common to convert existing gasoline pump or dispensing systems in the field from one hose configuration to another, such as converting a system from a non-vapor recovery system, to a vapor recovery equipped dispensing system or pump, for example. Also, similar conversions may occur at the gasoline pump or dispenser manufacturing facility, as customers change their orders to meet regulatory requirements, and/or upgrade their order specification to incorporate new hose and nozzle technologies as they become available.

The design of prior gasoline dispensing systems provided for the connection of only one hose configuration. Accordingly, if the hose configuration of a particular such pump is changed either in the field or at the pump manufacturer's facility, the previously installed hose adapter must be completely removed, and a new adapter installed. Such refurbishing of gasoline dispensers is very time consuming, and involves removing panels from the pump housing, for permitting various piping to be physically separated from the existing hose fittings. Fasteners mounting the fittings to the dispenser must be removed, new fittings installed, and various piping refitted to accommodate the new fittings. The entire process is very labor intensive, and subject to leaking from the retrofitted fittings, increasing maintenance problems.

There are many examples in the prior art of apparatus for permitting hose or connector configurations of one type to be connected to a configuration of another type. For example, Campbell, U.S. Pat. No. 1,752,631, discloses a mounting for feed valves that permits supply ports of one configuration to be connected to discharge ports of another configuration, for use in air brake systems. Also, other examples include Myers, U.S. Pat. No. 1,383,008, who teaches a coupling device for connecting a valve of one configuration to another valve having a different configuration. Hewitt, U.S. Pat. No. 1,820,020, discloses a pipe coupling for permitting different size pipes to be coupled to conduits of engines.

Other prior examples include Robinson, U.S. Pat. No. 2,209,350, who discloses a connector for use in railway cars, for permitting a car not equipped with a particular type of connector to be coupled to another car equipped with a particular connector. Chedister, U.S. Pat. No. 2,295,832, discloses a manifold adapter for permitting a carburetor having two transversely positioned ports to be coupled to a manifold extending longitudinally of an engine. Davis et al., U.S. Pat. No. 3,720,378, teaches an oil adapter 23 (see FIG. 2) or gas adapter 45 (see FIG. 4) for use in an industrial burner or furnace, such as those used in oil refineries, including a manifold 11 (see FIG. 1), for permitting the burner to be quickly adapted to either gas or oil fuels.

Barrera, U.S. Pat. No. 3,811,712, discloses an adapter for permitting interconnection of two ports of two devices, where the ports of each device have different configurations relative to the other.

SUMMARY OF THE INVENTION

An object of the invention is to provide a hose adapter for gasoline dispensers that facilitates the retrofitting of the dispenser to any one of a plurality of various vapor recovery and non-vapor recovery hose configurations.

Another object of the invention is to provide an improved hose adapter for gasoline dispensers or pumps.

With the problems of the prior gasoline dispenser or pumping systems in mind, the present invention provides a universal hose adapter that includes a first or uppermost piece or member for permanent mounting to the gasoline dispenser, and a plurality of different lower portions or members that are easily mounted to the upper member, whereby each lower member accommodates a different hose configuration. The uppermost member of the hose adapter, in one embodiment of the invention, includes a through port for vapor recovery, and two other through ports for two different grades or octane levels of gasoline. The vapor recovery port provides for either vacuum assist or pressure balanced recovery systems. The lowermost members of the hose adapters each include appropriate uppermost ports for mating to the upper member of the hose adapter, whereby the lower ports of the lowermost members are configured for connecting via internal passageways the appropriate ones of the ports of the uppermost member of the adapter through to a particular hose configuration.

BRIEF DESCRIPTION OF THE DRAWINGS

The various embodiments of the present invention will be described in detail with reference to the drawings in which like items are indicated by the same reference designation:

FIG. 1A is a cross-sectional view showing mated upper and lower members or portions of a hose adapter of one embodiment of the invention.

FIGS. 1B, 1C, 1D, and 1E, show top and bottom plan views, cross-sectional view along 1D—1D of FIG. 1B, and end plan view, respectively, of the upper member of FIG. 1A.

FIGS. (4A–4D) through (8A–8D), for each group show a top plan view, a longitudinal central cross-sectional view (along 4B, 5B, 6B, 7B, and 8B, respectively), a bottom plan view, and an end plan view, respectively, of the lower portions or members of other embodiments of the invention.

Figure 9A:
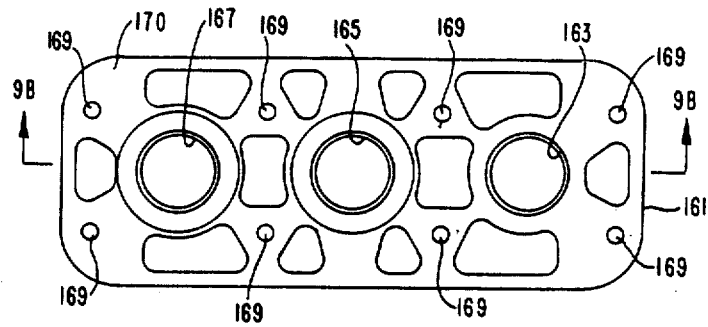
Figure 9B:
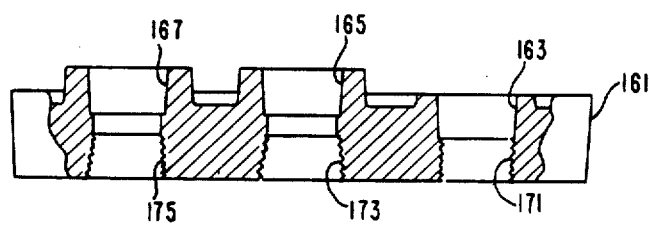
Figure 9C:
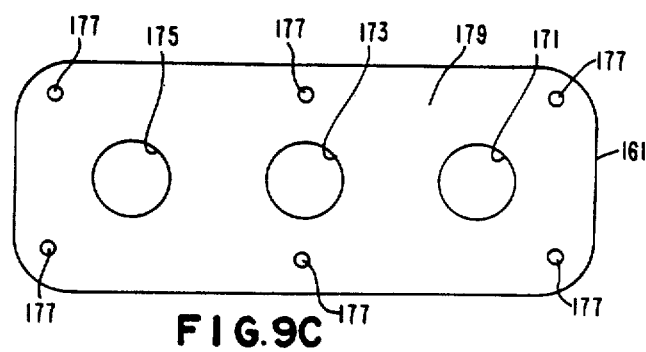
Figure 9D:
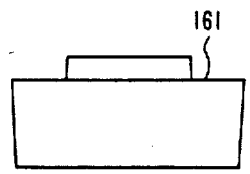

FIGS. 9A through 9D show a top plan view, a cross-sectional view along 9B of FIG. 9A, a bottom plan view, and an end view of a top portion or member of another embodiment of the invention.

DETAILED DESCRIPTION OF THE PREFERRED EMBODIMENTS OF THE INVENTION

With reference to FIGS. 1A, and FIGS. 3A through 3D, the present invention comprises a hose adapter 1 for facilitating the retrofitting of blending type gasoline dispensers or pumps to accommodate any one of a plurality of different dispenser hose configurations. The adapter 1 includes an upper portion 3 which is permanently mounted on the upper pump piping housing 5 of a gasoline dispenser, as shown. In this example, the upper portion or member 3 is bolted to the pump housing 5 via bolts 7. The upper portion 3, as shown in FIGS. 1A through 1E, includes vapor inlet and outlet ports 9', and 9, respectively, connected by an internal through passageway 10; gasoline inlet and outlet ports 11 and 11', respectively, connected by an internal passageway 12, for a first grade or octane level of gasoline; and second fuel or gasoline inlet and outlet ports 13 and 13', respectively, connected by an internal passageway 14, for another grade or octane level of gasoline. Circular grooves or recesses 15, 17, and 19 are provided concentric to the first gasoline inlet port 51, second gasoline inlet port 49, and vapor return outlet port 47', respectively, for accommodating pressure seals 21, in a lower portion or member 45. In this example, O-rings are provided for the pressure seals 21. Note that in other applications, the standardized upper member 3 of the present hose adapter 1 may be configured other than as shown. For example, more than one vacuum through port, and more than two gasoline through ports, may be included. The configuration of upper member 3, as shown in the present illustration, accommodates connection to many of the various piping configurations presently in use in the field in blending type gasoline dispensers. Also, the upper and lower members 3, 45, respectively, can be fabricated from a casting or machined out block of suitable material.

In a typical installation, the upper member 3 is permanently mounted on its associated dispenser, as previously described. When vapor recovery is included, a vapor recovery or return pipe (not shown) is connected via conventional coupling means to vapor return outlet port 9. In this example, as shown in the figures, the upper member 3 includes first and second gasoline inlet ports 11 and 13, respectively, for coupling to dispenser gasoline pipes or lines (not shown) delivering first and second grades of gasoline, which may be dispensed individually or in a blended combination, as is known in the art. The upper member, as illustrated herein, is configured for handling two grades of gasoline, for purposes of simplicity and detailing the most common situation for blending dispensers. However, such an illustration is not meant to be limiting, and within practical limits, a plurality of more than two gasoline ports can be included in upper member 3, for handling more than two grades of gasoline.

The lower member 45, in the embodiment of FIG. 1A, is configured for connection to a hose configuration for a dispensing system including vapor recovery and blending of the first and second gasolines after exiting from lower member 45. As will be described below in greater detail, this and other embodiments of the invention include different configurations for the lower portion of the hose adapter 1 for accommodating connection to other types of hose configurations and dispenser system functions.

In the embodiment of FIGS. 2A through 2D, a lower portion 23, includes on its uppermost face, for mating to the lower face of the upper portion 3, a vapor return output port 25, and two gasoline input ports 27 and 29, for mating to the vacuum or vapor return inlet port 9', and gasoline outlet ports 11' and 13', of the upper portion 3, respectively. In this example, bolts 31 are inserted through bolt holes 32 of the lower member 23 for securing this portion 23 to the upper member 3, via threaded holes 35 provided therein. The upper portion or member 3 of hose adapter 1 mates to the lower portion or member 23.

With further reference to FIGS. 2A through 2D, in this embodiment, the lower portion 23 of hose adapter 1 further includes merger of the internal passageways 28, 30, connecting gasoline input ports 27 and 29, respectively, to internal passageway 40 exiting at a single gasoline output port 37. Mixing of the gasolines discharged into the input ports 27 and 29 of the lower portion 23, is provided at the merger of passageways 28 and 30, into passageway 40. Two transverse grooves 39 and 41 are provided in juxtaposition across the throat of the output port 37, as shown. The grooves 39 and 41 are included for retaining O-ring seals, for example, as part of a hose coupling mechanism. The vapor outlet port 25 is connected via an inclined internal passageway 26 to vapor return input port 43 that is concentric with and forward of the internal blended gasoline output port 37. In this manner, a coaxial hose configuration including an inner hose 34 for carrying gasoline that is coupled to the output port 37, and an outer hose 36 for providing a vapor return path is coupled to the output port 43, in this example, via a conventional coaxial hose coupling mechanism that plugs into port 37 and screws into port 43. Also, "O"-ring circular grooves 38, 42, 44, are provided around ports 29, 27, and 25, respectively. Bolt through holes 32 are provided for mounting purposes.

In another embodiment of the invention, the lower portion of the adapter 1 is provided in a configuration, as shown in FIG. 1A, and FIGS. 3A through 3D, for the lower portion or member 45. As shown, the lower member 45 is configured for connection to a hose system (not shown) that provides vapor recovery, and blending at the nozzle (not shown), or between adapter 1 and a nozzle. As illustrated, the lower portion 45, which can be alternatively designated as a hose coupling member 45, includes a vapor return or vacuum input port 47, connected via internal passageway 48 to vapor return output port 47'; the latter being coupled to vapor return inlet port 9' of the pump housing member 3. A first gasoline input port 49 is connected to gasoline port 11' of upper segment 3, and a second gasoline port 51 is connected to gasoline port 13' of upper segment 3. The first gasoline input port 49 is connected via internal passageway 50 which reduces to a narrow circular channel 53 within the interior portion of the lower segment 45, as shown. Channel 53 exits into the throat of a first gasoline output port 57. The second gasoline input port 51 is connected via an L-shaped passageway 52 to a second gasoline output port 55 that is concentric with and internal to first gasoline output port 57, as shown. Transverse grooves 59 and 61 are provided in the throat of the output port 55, as shown, for retaining O-ring seals. A coaxial or hose-within-a-hose combination is connected to the output ports 55 and 57, with the inner hose being coupled to output port 55, and the outer hose coupled to output port 57, in an appropriate manner. The outer hose (not shown) is for carrying a first grade of gasoline discharge from port 49 to the nozzle (not shown) or a mixing manifold (not shown), and the inner hose (not shown) is for carrying a second grade of gasoline discharged from output port 55 to the nozzle or a mixing chamber (not shown). Bolt holes 33 are provided for mounting purposes. Circular "O"-ring grooves 15, 17, 19, are provided about ports 51, 49, and 47', respectively, each for receiving an "O"-ring 21, as previously described.

Figure 2A:
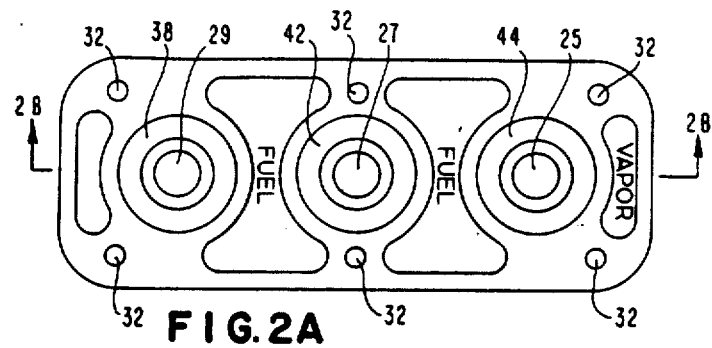
FIGS. 2A through 2D show top plan view, cross-sectional view along 2B of FIG. 2A, bottom plan view, and end plan view, respectively, of the lower member of another embodiment of the invention.
Figure 2B:
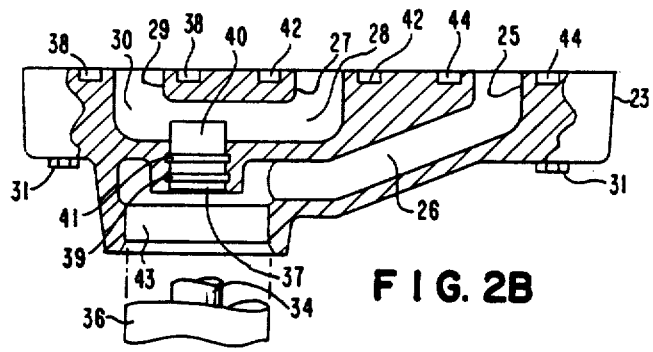
Figure 2C:
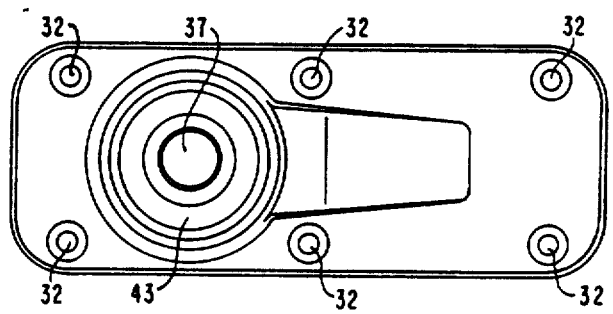
Figure 2D:
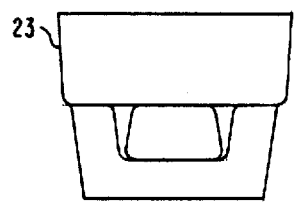
Figure 3A:
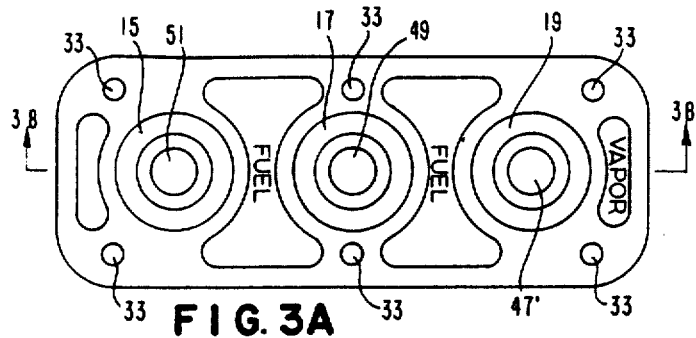
FIGS. 3A through 3D show top plan view, cross-sectional view along 3B of FIG. 3A, bottom plan view, and an end plan view, respectively, of the lower member of FIG. 1A.
Figure 3B:
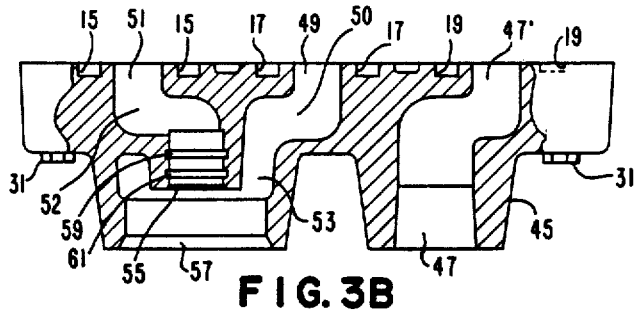
Figure 3C:
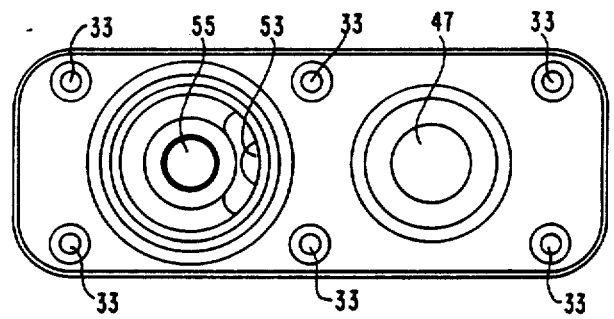
Figure 3D:
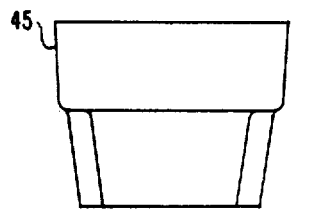
Figure 4A:
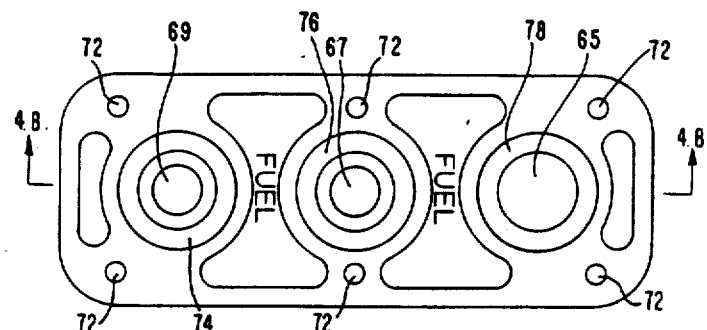
Figure 4B:
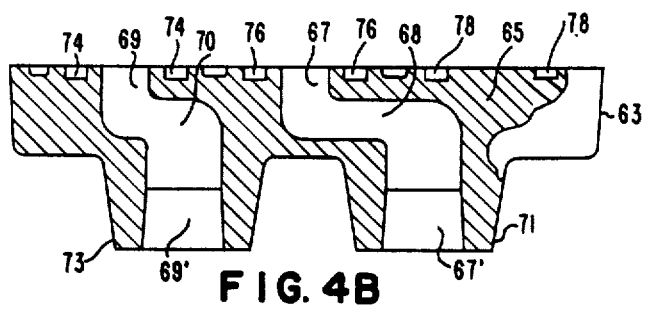
Figure 4C:
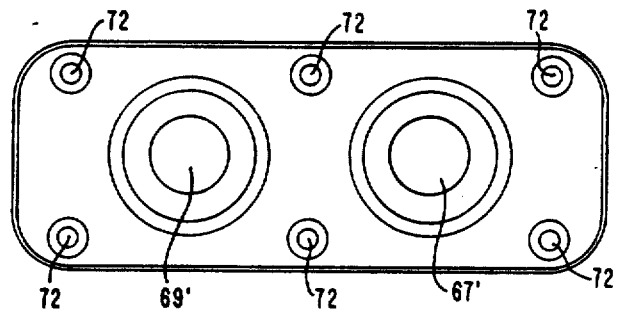
Figure 4D:
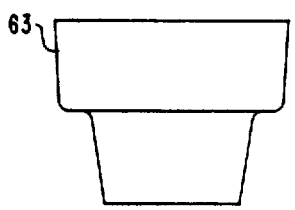

In FIGS. 4A through 4D, another embodiment of the invention is shown for adapting to a hose configuration for a non-vapor recovery blending gasoline dispensing system, including blending at or proximate a nozzle. In this embodiment, the lower segment or hose coupling segment 63 of the adapter 1 includes a solid portion 65 for blocking off the vacuum or vapor return port 9' of upper segment 3, and gasoline input ports 67 and 69, coupled by passageways 68, 70, respectively, to first and second gasoline output ports 67' and 69', respectively. The first and second gasoline outlet ports 11 and 13, respectively, of upper segment 3, are coupled to input ports 67 and 69, as shown. The first and second gasoline output ports 67' and 69' of hose adapter segment 63 are configured for coupling to first and second independent gasoline hoses, respectively (not shown). Protruding circular bosses 71 and 73 provide the hose coupling surfaces for the first and second gasoline output ports 67 and 69, respectively. FIGS. 4B and 4C show the top and bottom plan views of lower segment 63. Bolt through holes 72 are provided for mounting purposes. "O"-ring circular grooves 74, 76, and 78 are provided about ports 69, 67, and blocking surface 65, respectively.

Figure 5A:
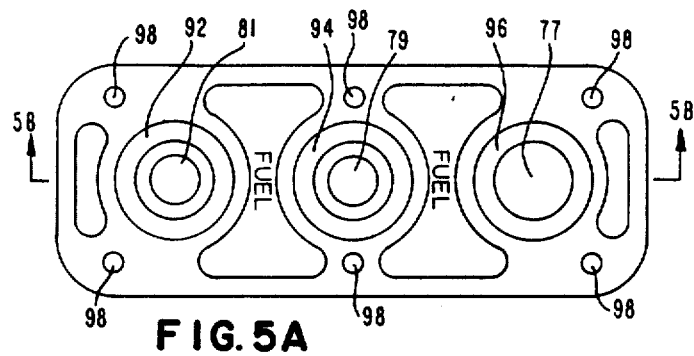
Figure 5B:
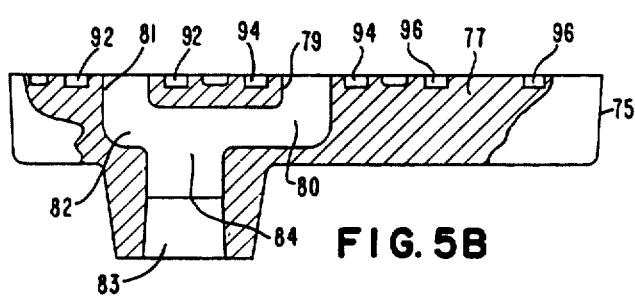
Figure 5C:
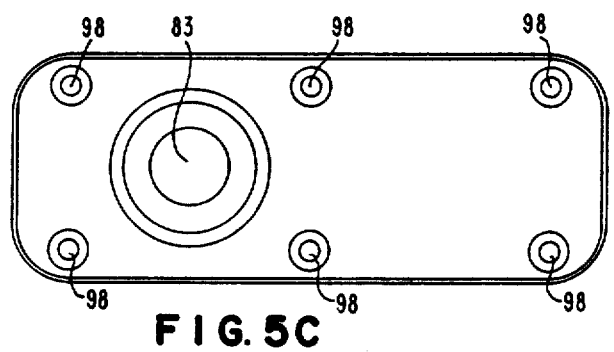
Figure 5D:
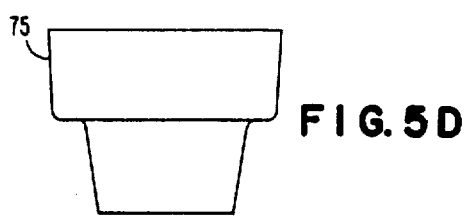

Yet another embodiment of the invention, as shown in FIG. 5A, for coupling to a hose configuration for a non-vapor recovery gasoline dispenser including blending within a lower segment 75 having a solid portion 77 for blocking off the vapor port 9' of upper segment 3, and a pair of gasoline input ports 79 and 81 for receiving different grades of gasoline from ports 11' and 13' of the upper segment 3, respectively. The passageways 80 and 82 of the first and second gasoline port 79 and 81 merge within a central portion 84 of the lower segment 75 as shown, for mixing the two different grades of gasoline received from upper segment 3 together, for discharge into a lowermost output port 83. The lowermost blended gasoline output port 83 is formed by a circular boss for coupling to a single gasoline hose (not shown) via appropriate mechanical coupling means. FIGS. 5B and 5C show top and bottom views of the lower segment 75. "O"-ring grooves 92, 94, 96 are provided about ports 81, 79, and blocking surface 77, respectively. Bolt through holes 98 are provided for mounting purposes.

Figure 6A:
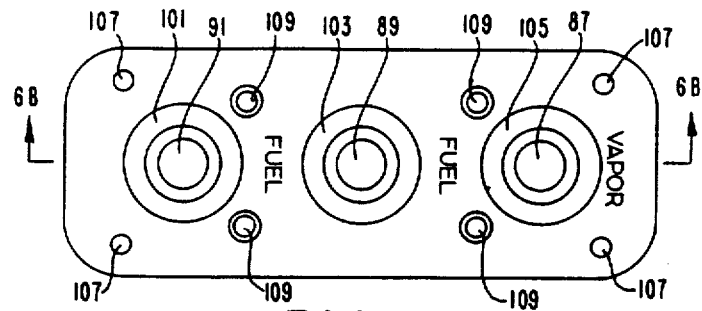
Figure 6B:
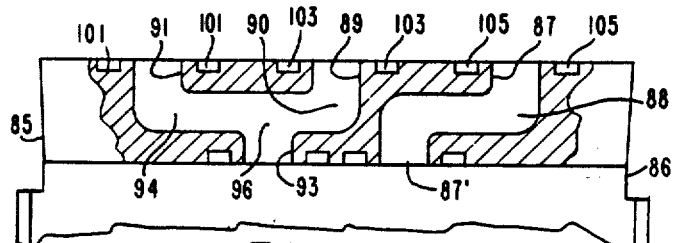
Figure 6C:
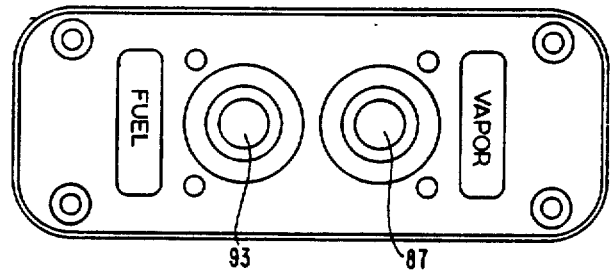
Figure 6D:
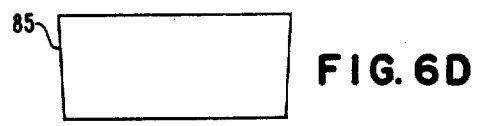
Figure 7A:
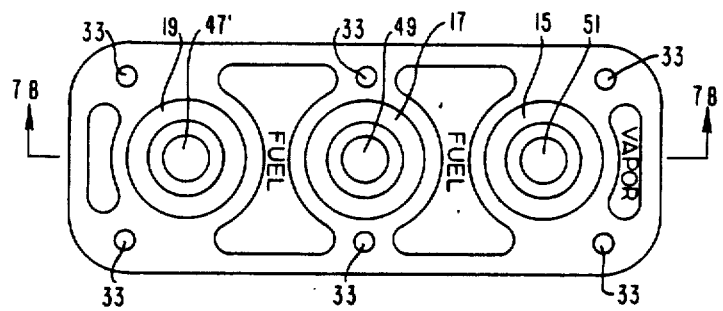
Figure 7B:
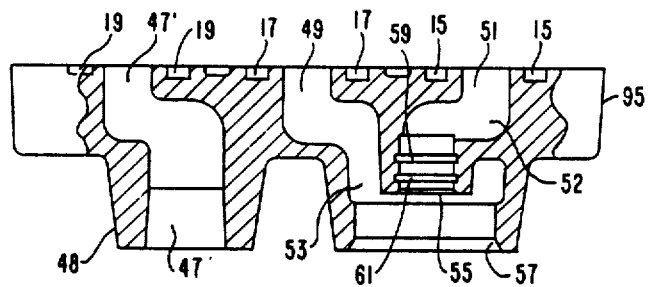
Figure 7C:
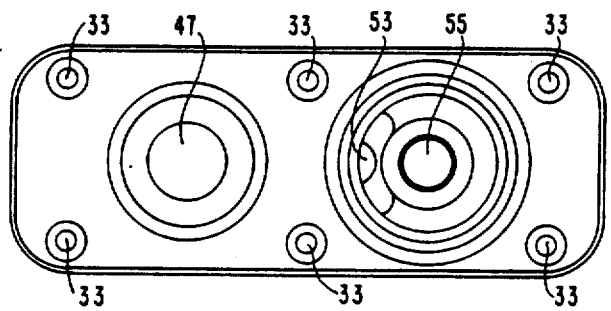
Figure 7D:
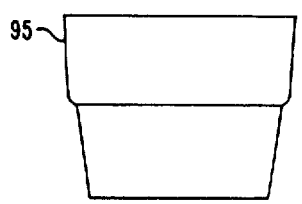
Figure 8A:
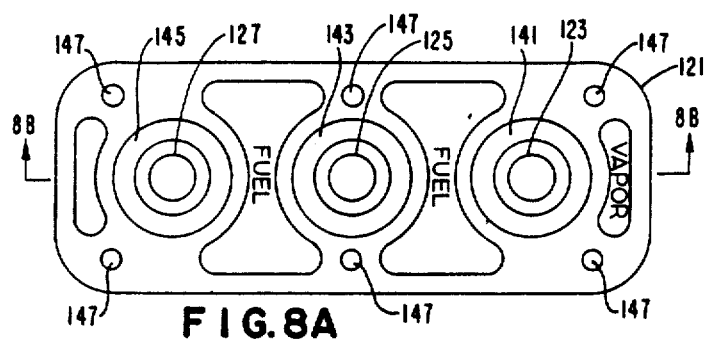
Figure 8B:
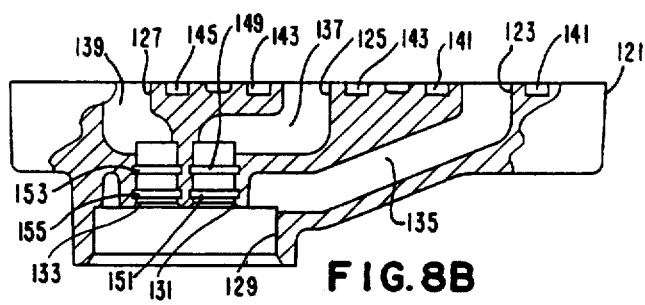
Figure 8C:
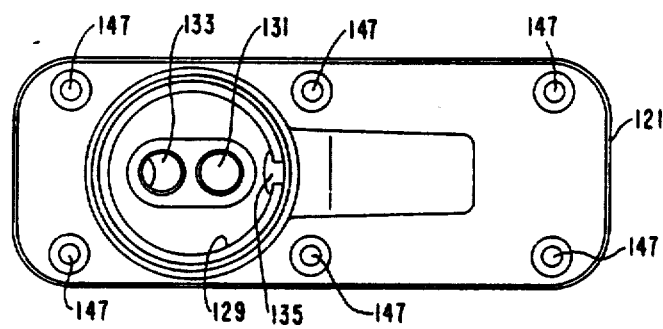
Figure 8D:
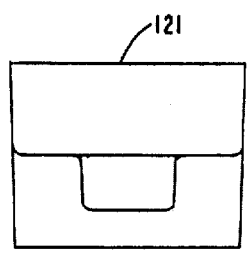

Another embodiment of the invention includes a lower segment or hose coupling segment 85, as shown in FIG. 6A, for coupling to a modified "EMCO WHEATON A227 Vapor Valve" 86 (manufactured by EMCO WHEATON, Raleigh, N.C.). As shown, the lower segment 85 includes a vapor return output port 87, a first gasoline input port 89, and a second gasoline input port 91. The internal passageways 90 and 94 of gasoline ports 89 and 91, respectively, merge in a central passageway 96 of the lower segment 85, for mixing and discharging the first and second grades of gasoline received from ports 11' and 13' of the upper segment 3 into an output port 93, as shown. Note that the uppermost or input portions of vapor return output port or vacuum port 87, and gasoline input ports 89 and 91, are all flush with the uppermost face of the lower segment 85. Similarly the gasoline output ports 87 and 93 are flush with the lowermost transverse face of the lower segment 85 for coupling to the "EMCO WHEATON A227 Vapor Valve" 86. FIGS. 6B and 6C show the top and bottom plan views of the lower member 85. Circular "O"-ring grooves 101, 103, 105 are provided about ports 91, 89, and 87, respectively. Bolt through holes 107 are provided for mounting lower member 85 to upper member 3. Also, bolt holes 109 are provided for mounting the valve 86 to lower member 85.

Yet another embodiment of the invention, as shown in FIGS. 7A through 7D, provides a configuration of ports for a lower or hose coupling segment 95 of adapter 1, for adapting a gasoline dispenser to connect to a hose assembly system for a "Healy" vapor recovery dispensing system providing blending at a nozzle (not shown). Healy vapor recovery systems are manufactured by Cambridge Engineering Inc., North Billerica, Mass. In this lower segment 95, the configuration is the same as that of lower segment 45 of FIG. 3, except that the latter is turned 180° for providing the required output port configuration. By turning adapter 45 through 180°, relative to its positioning in FIG. 3, for coupling to the upper segment 3, a coaxial or hose within a hose combination (not shown) can be connected with the inner hose coupled to the inner port 55, which is now coupled via passageway 52 and port 51 to the vapor return inlet port 9' of the upper segment 3, and the outer hose coupled to the outer output port 57 for receiving discharge of a first grade or octane rating of gasoline from gasoline output port 11' of upper segment 3. A third hose (not shown) is connected to the circular boss 48 for port 47, for discharging a second grade of gasoline into this third hose, as received from gasoline port 13' of upper segment 3.

With reference to FIGS. 8A through 8D, another embodiment of the invention includes a lower member 121 having a vapor outlet port 123, a first fuel or gasoline inlet port 125, a second fuel or gasoline inlet port 127, a vapor inlet port 129, a first fuel outlet port 131, a second fuel outlet port 133, an internal substantially inclined passageway 135 for connecting vapor outlet port 123 with vapor inlet or return port 129, a substantially L-shaped internal passageway 137 for connecting the first fuel inlet port 125 with the first fuel outlet port 131, a substantially straight through internal passageway 139 connecting the second fuel inlet port 127 with the second fuel outlet port 133, "O"-ring grooves 141, 143, and 145, encircling vapor return outlet port 123, first fuel inlet port 125, and second fuel inlet port 127, respectively, mounting bolt through holes 147, "O"-ring grooves 149 and 151 spaced apart within the inside walls of the first fuel outlet port 131, and "O"-ring grooves 153 and 155 spaced apart within the interior walls of the second fuel outlet port 133. In this embodiment, the configuration for the lower member 121 provides for vapor recovery, and blending of the first and second fuels after they are delivered from lower member 121 into a triaxial hose configuration (not shown). The triaxial hose configuration includes two inner hoses for coupling to the first and second fuel outlet ports 131, 133, respectively, and an outer hose containing the fuel hoses, whereby the outer hose is coupled to the vapor return or inlet port 129.

With reference to FIGS. 9A through 9D, still another embodiment of the invention includes a modified upper member 161, including a vapor return outlet port 163, a first fuel inlet port 165, a second fuel inlet port 167, threaded holes 169 for mounting the upper face 171 of the upper member 161 to the upper housing of the associated dispenser, a vapor return inlet port 171, a first fuel outlet port 173, a second fuel outlet port 175, and threaded holes 177 for permitting associated lower members as previously described to be rigidly mounted to the lower face 179 of this alternative upper member 161. Relative to the upper member 3 shown in FIGS. 1B–1E, this alternative embodiment includes elongated passageways for connecting the ports on the upper face 170 to their associated ports on the lower face 179, with the ports 171, 173, and 175 on the lower or bottom face 179 each being threaded for permitting hoses to be directly coupled to these ports via conventional threaded connectors, without requiring the use of a lower member in particular applications. However, for other applications requiring any of the lower member configurations previously illustrated above, this alternative upper member 161 provides for the mounting of such lower members to the bottom face 179 via the threaded holes 177, as previously mentioned.

Various embodiments of the present invention have been shown and described for adapting a gasoline dispenser to six different hose configurations, via the use of six differently configured lower hose coupling sections of adapter As indicated, the upper member 3 of hose adapter 1 can be identically configured in each embodiment of the invention, in this example. Other configurations, such as other port configurations for the upper and lower members of the present adapter 1 may occur to those of ordinary skill in the art, for coupling to yet other hose assemblies for use in gasoline dispensing systems. Accordingly, many other advantages and variations of the present embodiments of the invention may become apparent to those of skill in the art, wherein such variations or alternative embodiments are covered by the spirit and scope of the appended claims.

What I claim is:

1. A universal hose adapter facilitating retrofitting a gasoline dispenser for connection to any one of a plurality of different vapor recovery or non-vapor recovery hose configurations, comprising;
   an upper member adapted for rigid mounting upon a piping housing of said gasoline dispenser, said upper member including upon its upper face a vapor return outlet port, a plurality of gasoline inlet ports for receiving different grades of gasoline, respectively, a first internal passageway from said vapor outlet port through said upper member for providing a vapor return inlet port upon a lower face of said member, and a plurality of second internal passageways from said gasoline inlet ports, respectively, through said upper member for providing a plurality of gasoline output ports for said different grades of gasoline, respectively; and
   a plurality of lower members each being adapted for rigid mounting upon said upper member, with said lower face of said upper member proximate an upper face of a selected one of said lower members, said plurality of lower members each including first port means along an upper face for individual connection to a predetermined combination of selected ones of said vapor return inlet port and plurality of gasoline outlet ports of said upper member, second port means along a lower face for connection to a predetermined hose configuration unique to each one of said lower members, respectively, and internal passageway means for connecting said first port means to said second port means, respectively, thereby permitting selection of the appropriate one of said lower members for connection of a particular one of said plurality of hose configurations to said gasoline dispenser.

2. The universal hose adapter of claim 1, wherein one of said plurality of lower members is configured to provide both connection to a vapor recovery hose configuration, and blending of first and second grades of gasoline within said one lower member, including:
   said first port means including a vapor return outlet port for coupling to said vapor return inlet port of said upper member, and first and second gasoline input ports for coupling to first and second gasoline outlet ports of said upper member;
   said second port means including a lowermost vapor return inlet port having a relatively large inside diameter, for coupling to an end of a vapor return hose, and a blended gasoline output port internal of and concentric with said gasoline output port, for coupling to an end of a gasoline hose that is carried within said vapor return hose; and
   said internal passageway means including a first passageway between said vapor return outlet port and said vapor return inlet port, a second passageway between said first and second gasoline input ports, and a third passageway between said second passageway and said blended gasoline output port.

3. The universal hose adapter of claim 2, wherein said blended gasoline output port is located substantially in vertical alignment between said first and second gasoline input ports.

4. The universal hose adapter of claim 1, wherein one of said plurality of lower members is configured to provide connection to a vapor recovery hose configuration, for a dispenser providing blending of first and second grades of gasoline after discharge into said hose configuration, said one lower member including:
   said first port means including a vapor return outlet port for coupling to said vapor return inlet port of said upper member, and first and second gasoline input ports for coupling to said first and second gasoline outlet ports of said upper member;
   said second port means including an independent vapor return input port, a lowermost first gasoline output port having a relatively large inside diameter, for coupling to an end of a first gasoline hose, and a second gasoline output port internal of and substantially concentric with said first gasoline port, for coupling to an end of a second gasoline hose that is carried within said first gasoline hose; and
   said internal passageway means including a first passageway between said vapor return input and output ports, a second passageway between said first gasoline input port and first gasoline output port, and a third passageway between said second gasoline input port and second gasoline output port.

5. The universal hose adapter of claim 1, wherein one of said plurality of lower members is configured to provide connection to a non-vapor recovery hose configuration for a dispenser including blending of different grades of gasoline after discharge of the latter into said hose configuration, said one lower member including;

blocking means for sealing off said vapor recovery inlet port of said upper member;

said first port means including first and second gasoline input ports for coupling to first and second gasoline outlet ports of said upper member, respectively;

said second port means including individual first and second gasoline output ports for connection to one end of first and second individual gasoline hoses; and said internal passageway means including a first independent passageway between said first gasoline input and output ports, and a second independent passageway between said second gasoline input and output ports.

6. The universal hose adapter of claim 1, wherein one of said plurality of lower members is configured to provide connection to a non-vapor recovery hose configuration, for a gasoline dispenser including blending of two different grades of gasoline within its said internal passageway means, said one lower member including:

blocking means for sealing off said vapor recovery inlet port of said upper member;

said first port means including first and second gasoline input ports for coupling to first and second gasoline outlet ports of said upper member;

said second port means including a blended gasoline output port, for coupling to one end of a gasoline hose; and said internal passageway means including a first passageway between said first and second gasoline input ports, and a third passageway between said first passageway and said blended gasoline output port 7. The universal hose adapter of claim 6, wherein said blended gasoline output port is located substantially in vertical alignment between said first and second gasoline input ports.

8. The universal hose adapter of claim 1, wherein one of said plurality of lower members is configured to provide vapor recovery and blending of two different grades of gasoline within its said internal passageway means, and connection to a predetermined device, said one lower member including:

said first port means including a vapor return outlet port for coupling to said vapor return inlet port of said upper member, and first and second gasoline input ports for coupling to first and second gasoline outlet ports of said upper member, respectively;

said second port means including an independent vapor return input port, and a blended gasoline output port; and said internal passageway means including a first passageway between vapor return input and output ports, a second passageway between said first and second gasoline input ports, and a third passageway between said second passageway and said blended gasoline output port, the gasoline received from said first and second gasoline input ports being mixed or blended in said third passageway.

9. The universal hose adapter of claim 8, wherein said independent vapor return input port and blended gasoline output port are flush with the lowermost or bottom face of said one lower member.

10. The universal hose adapter of claim 8, wherein said blended gasoline output port is located substantially in relative vertical alignment between said first and second gasoline input ports.

11. The universal hose adapter of claim 1, wherein one of said plurality of lower members is configured to provide connection to a standard "Healy" vapor recovery nose system, with blending of first and second grades of gasoline being after discharge thereof into said hose system, said one lower member including:

said first port means including a vapor return outlet port for coupling to said vapor return inlet port of said upper member, and first and second gasoline input ports for coupling to first and second gasoline outlet ports of said upper member;

said second port means including an independent first gasoline output port for coupling to an end of a first gasoline hose, a second gasoline output port having a relatively large inside diameter, for coupling to an end of a second gasoline hose, and a vapor return input port internal of and concentric with said second gasoline output port, for coupling to an end of a vapor return hose that is carried within said second gasoline hose; and said internal passageway means including a first passageway between said vapor return output port and vapor return input port, a second passageway between said first gasoline input port and first gasoline output port, and a third passageway between said second gasoline input and output ports.

12. The universal hose adapter of claim 1, wherein one of said plurality of lower members is configured to provide connection to a vapor recovery hose configuration, for a dispenser providing blending of first and second grades of gasoline after discharge into said hose configuration, said one lower member including:

said first port means including a vapor return outlet port for coupling to said vapor return inlet port of said upper member, and first and second gasoline input ports for coupling to said first and second gasoline outlet ports of said upper member;

said second port means including a lowermost vapor return inlet port of relatively large inside diameter, for coupling to one end of a vapor return hose, a first gasoline output port internal of and substantially centrally located within said vapor return inlet port for coupling to a first fuel hose carried within said vapor return hose, and a second gasoline output port internal of and substantially centrally located within said vapor return inlet port proximate to said first gasoline output port, for coupling to a second fuel hose carried within said vapor return hose; and said internal passageway means including a first passageway between said vapor return inlet and outlet ports, a second passageway between said first gasoline input and output ports, and a third passageway between said second gasoline input and output ports.

13. The universal hose adapter of claim wherein said upper member further includes said vapor return inlet port being threaded, and selected ones of said plurality of gasoline output ports being threaded, for permitting the direct coupling of vacuum and fuel hoses thereto, respectively.

14. The universal hose adapter of claim 13, wherein said vapor return inlet port, and the selected ones of said plurality of gasoline output ports each have relatively elongated associated internal passageways.

15. The universal hose adapter of claim 1, wherein said plurality of lower members further include "O"-ring grooves encircling each one of said first port means.

16. A universal hose adapter facilitating retrofitting a gasoline dispenser for connection to any one of a plurality of different vapor recovery or non-vapor recovery hose configurations, comprising;
  an upper member adapted for rigid mounting upon a piping housing of said gasoline dispenser, said upper member including upon its upper face a vapor return outlet port, at least one gasoline inlet port for receiving a predetermined grade of gasoline, a first internal passageway from said vapor outlet port through said upper member for providing a vapor return inlet port upon a lower face of said member, and at least a second internal passageway from said at least one gasoline inlet port through said upper member for providing at least one gasoline output port for said different grades of gasoline, respectively; and
  a plurality of lower members each being adapted for rigid mounting upon said upper member, with said lower face of said upper member proximate an upper face of a selected one of said lower members, said plurality of lower members each including first port means along an upper face for individual connection to a predetermined combination of selected ones of said vapor return inlet port and said at least one gasoline outlet port of said upper member, second port means along a lower face for connection to a predetermined hose configuration unique to each one of said lower members, respectively, and internal passageway means for connecting said first port means to said second port means, respectively, thereby permitting selection of the appropriate one of said lower members for connection of a particular one of said plurality of hose configurations to said gasoline dispenser.

17. The universal hose adapter of claim 16, wherein one of said plurality of lower members is configured to provide connection to a vapor recovery hose and gasoline hose, hose-within-a-hose configuration, said one lower member including:
  said first port means including a vapor return outlet port for coupling to said vapor return inlet port of said upper member, and a gasoline input port for coupling to said at least one gasoline outlet port of said upper member;
  said second port means including a lowermost vapor return inlet port of relatively large inside diameter, for coupling to one end of a vapor return hose, and a gasoline output port internal of and substantially centrally located within said vapor return inlet port for coupling to a first fuel hose carried within said vapor return hose; and
  said internal passageway means including a first passageway between said vapor return inlet and outlet ports, a second passageway between said gasoline input and output ports.

18. The universal hose adapter of claim 16, wherein said upper member further includes said vapor return inlet port being threaded, and said at least one gasoline output port being threaded, for permitting the direct coupling of vacuum and fuel hoses thereto, respectively.

19. The universal hose adapter of claim 18, wherein said vapor return inlet port, and said at least one gasoline output port each have relatively elongated associated internal passageways.

20. The universal hose adapter of claim 16, wherein said plurality of lower members further include "O"-ring grooves encircling each one of said first port means.

* * * * *

UNITED STATES PATENT AND TRADEMARK OFFICE
CERTIFICATE OF CORRECTION

PATENT NO. : 4,938,251

DATED : July 3, 1990

INVENTOR(S) : Roger F. Furrow and Kenneth L. Pope

It is certified that error appears in the above-identified patent and that said Letters Patent is hereby corrected as shown below:

Column 10, line 61:

Claim 13, line 1, after "claim" insert --1--.

Signed and Sealed this

Twentieth Day of August, 1991

*Attest:*

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,938,251

DATED : July 3, 1990

INVENTOR(S) : Roger F. Furrow and Kenneth L. Pope

It is certified that error appears in the above-identified patent and that said Letters Patent is hereby corrected as shown below:

Column 10, line 61:

Claim 13, line 1, after "claim" insert --1--.

Signed and Sealed this

Twentieth Day of August, 1991

Attest:

HARRY F. MANBECK, JR.

*Attesting Officer*    Commissioner of Patents and Trademarks